INVENTOR.
CLARENCE LLOYD CLAFF
BY
Kenway, Jenney + Hildreth
ATTORNEYS

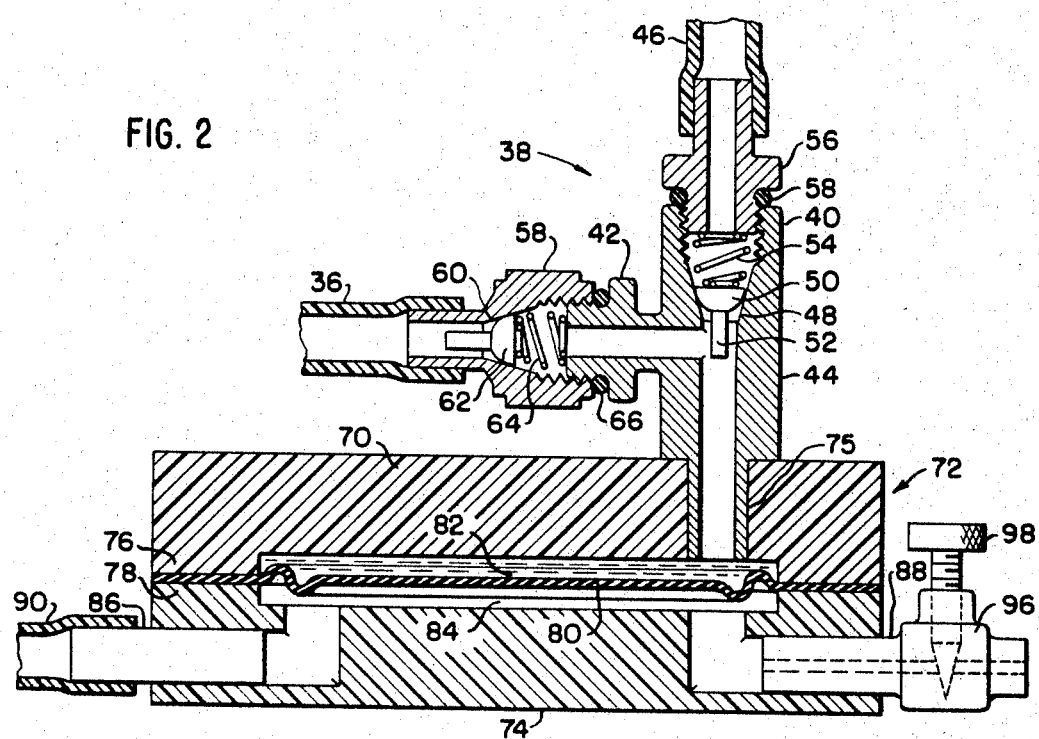
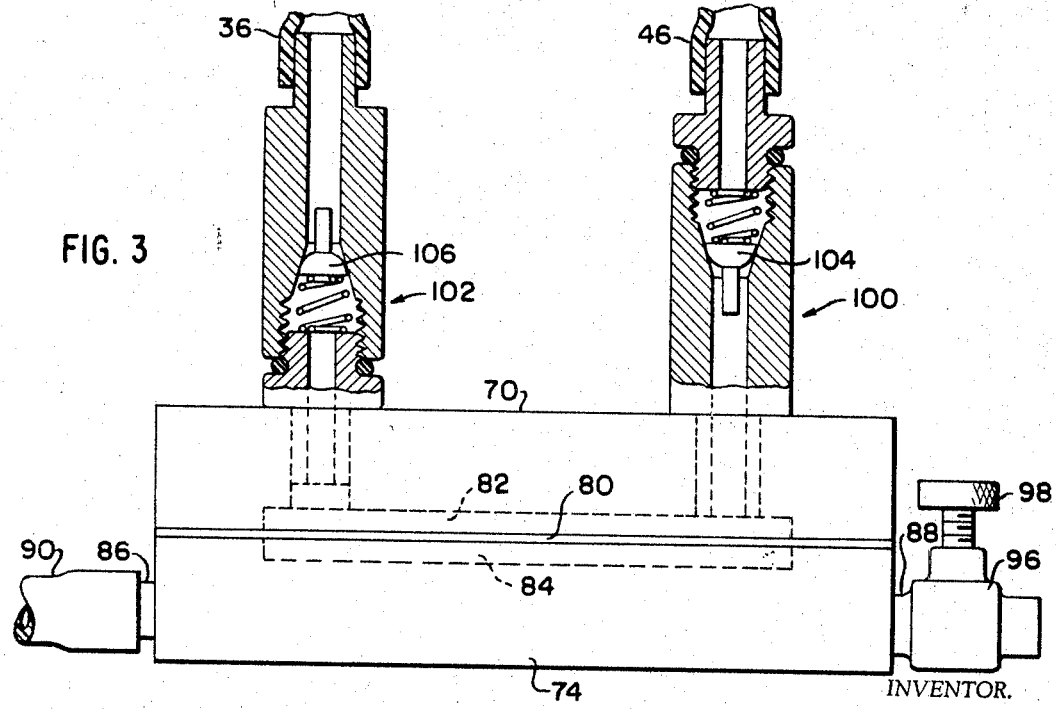

United States Patent Office 3,438,356
Patented Apr. 15, 1969

3,438,356
FLUID HABITAT OR BATH SYSTEM FOR MARINE BIOLOGICAL STUDIES
Clarence Lloyd Claff, 5 Van Beal Road, Randolph, Mass. 02154
Filed Mar. 31, 1967, Ser. No. 627,456
Int. Cl. A01k 63/00, 64/00, 61/02
U.S. Cl. 119—1                6 Claims

ABSTRACT OF THE DISCLOSURE

This invention relates to fluid bath habitat or systems for biological studies of marine life, such as fish, in which the apparatus is adapted to be made in miniaturized version in order to obtain accurate measurements of the biological functions of very small fish. The apparatus comprises in combination a fish tank, a manometer for measuring the oxygen consumption of the fish, a chamber for compensating the fish tank against the effects of ambient temperature change, an oxygen electrode for measuring the oxygen tension or vapor pressure of the fluid of the bath, and a pumping means for activating the oxygen cell ii periodic manner when it is desired to measure the oxygen tension. In use, the various portions of the complete system are assembled in a closed circuit with the fish contained in the fluid bath, and because of the construction of the elements of the system and the manner in which they are assembled, all the parts of the system may be in miniaturized form, so that the functions of extremely small fish may be measured.

Background of invention

In the study of marine life such as, for example, fish it is often necessary to measure very accurately the metabolism or other physiological functions of the fish by immersing the latter in a fluid or bath, and then over a period of time making accurate measurements of the rate of respiration of the fish, its use of oxygen, etc. In the study of such marine life forms, it is often desired to study those which are very small in size, but this has been proven difficult with standard apparatus because the size of the apparatus is many orders of magnitude larger than the life form itself with the result that the measurements of, for example, metabolism, oxygen consumption, carbon dioxide production, etc. are relatively inaccurate. There has arisen, therefore, the need for apparatus and a system of apparatus which can be made in miniature size, by means of which accurate measurements can be obtained.

Two of the specific problems hitherto experienced as causes of error are as follows: the first of these is that in a tank holding a fluid bath in which is immersed the fish, for example, being studied, there is nearly always a volume of gas or air above the level of the surface of the fluid. From this volume of air a connection will be made to a manometer in order to measure the pressure of the air in said volume. In view of the fact that as the life form (for example, a fish) goes through its physiological functions such as extracting oxygen from the fluid and delivering carbon dioxide and other products back into the water and the air, the pressure of the gas or air in the space above the level of fluid will change. It is desired to measure these changes, but it has been found that unless the temperature surrounding the whole apparatus is kept constant, then the effect of temperature change on the pressure of the gas or air volume above the fluid level is far greater than the change in that pressure caused by the respiration of the fish. This leads to a high order of inaccuracy.

The second problem that has been encountered is the fact that if a small fish (for example, a fish of not more than ¼ of an inch in length, and correspondingly having a low body mass and a low consumption of oxygen) is placed in one of the usual sized tanks, the effect of the respiration of the fish is so slight on the total volume and pressure of the gas above the liquid level of the bath, and also on the oxygen tension of the fluid bath itself, that a very large magnitude of error in measurements may be experienced.

Summary of invention

It is the general purpose of this invention, therefore, to provide a combination of apparatus in which the individual elements of the combination may be made in miniaturized version so that the errors mentioned above in obtaining the necessary readings of gas pressure and oxygen tension will be eliminated and accurate measurements may be made. Particularly, since in the system the oxygen tension is measured by an oxygen electrode such as a Clark cell, a novel pump is provided by which the fluid of the bath may be periodically circulated against the cell electrode's membrane in order to obtain accurate measurements of the oxygen tension. This pump is of novel construction and provides a positive displacement pump which requires a minimum of circulating fluid through it.

The proposed system is a closed system, and an external ambient compensating pressure chamber is provided which is connected to the outlet side of the manometer used to measure the gas pressure in the gas space above the surface of the fluid in the fish tank. The volume of the compensating chamber is made the same (or approximately so) as that of the gas volume of the study tank, and both the study tank and the compensating tank are subjected to the same ambient temperature change. As a result, the complete system is compensated against major errors due to such ambient temperature change.

One object, therefore, of the invention is to provide a system of apparatus for the study of the physiological functions of marine life, the elements of the system being so constructed and the elements being so connected that the whole system may be made in miniaturized version to obtain accurate measurements of such physiological functions.

A second object of the invention is the provision of a system of the class described above, in which means are provided for compensating the system against the effects of ambient temperature change.

A further object of the invention is the provision of a system of the above classes, in which pumping means are provided for periodically activating an oxygen cell for the measurement of oxygen tension in the system fluid, the pump being so constructed as to require a minimum of pumping fluid for its operation.

Yet another object of the invention is the provision of a system of any of the above classes which is easily put together and, with the exception of the pump itself, may be constructed by using laboratory glassware and other parts found in a conventional marine study laboratory.

Other objects and advantages of the invention will be in part obvious and in part pointed out hereinafter.

Description of drawings

In the accompanying drawings, in which is shown one embodiment of the invention:

FIG. 2 is a cross-sectional view of a pump of the present invention; and

FIG. 3 is a view, partly in section, of a pump similar to that shown in FIG. 2 but with a modification thereof.

Figure 1:
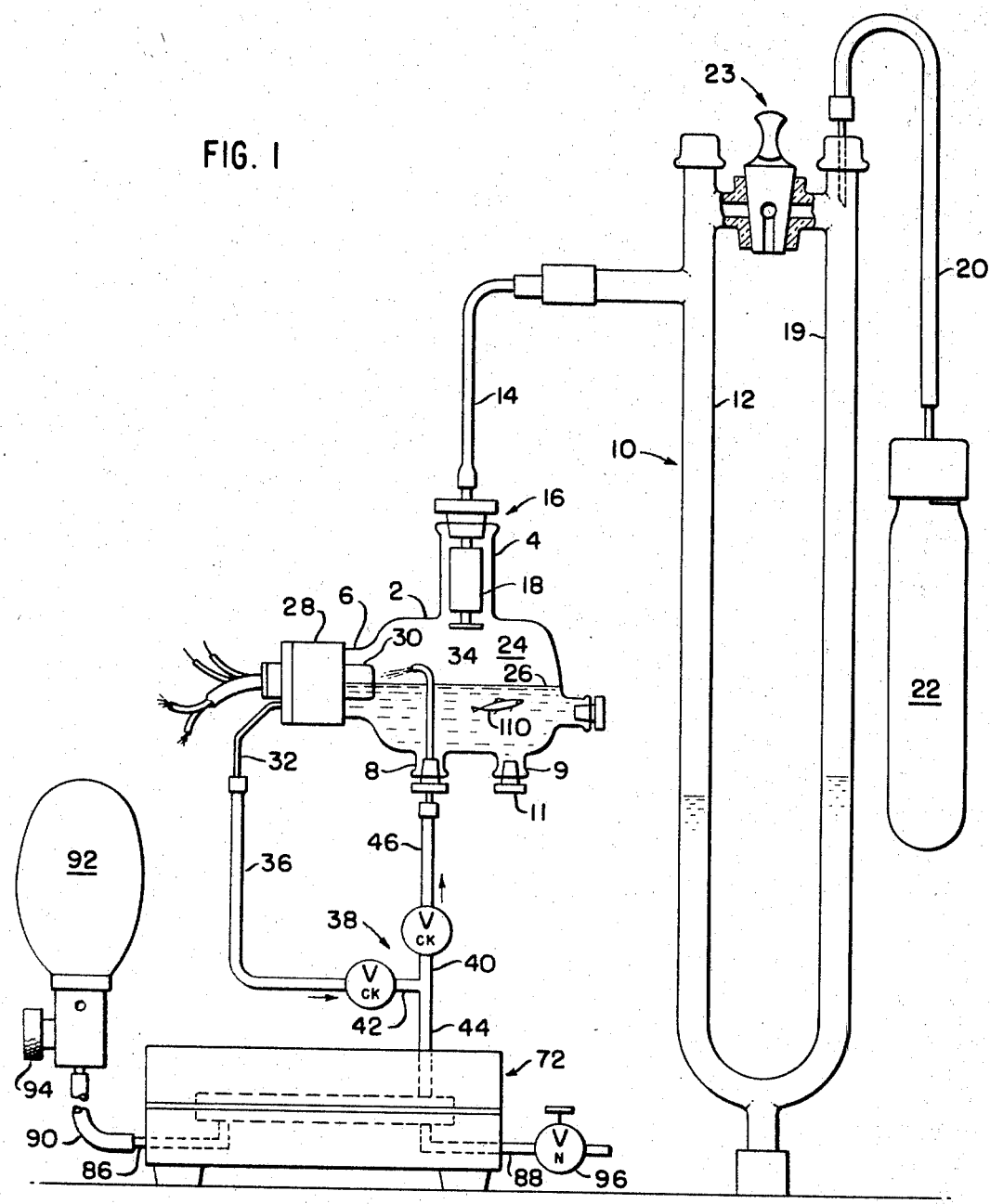
FIG. 1 shows an assembly of the system of the present invention, the drawing being partly schematic.

Throughout the several views of the drawings, similar reference characters indicate corresponding parts. Dimensions of certain of the parts as shown in the drawings may have been modified and/or exaggerated for the purposes of clarity of illustration, and the relative sizes of the parts may have been changed for the same reason.

The invention accordingly comprises the elements and combinations of elements, features of construction, arrangements of parts, and manipulation of the apparatus all of which will be exemplified in the structures hereinafter set forth, and the scope of the application of which will be indicated in the appended claims.

*Description of invention*

Referring now to FIG. 1, there is shown a layout of apparatus of the present invention. A tank 2 is provided, the tank being preferably made of a glass which is impervious to the fluid used in the physiological studies contemplated in the use of the apparatus. By this means, a visual study of the fish, for example, may be made. Tank 2 has four openings 4, 6, 8, and 9 each of these openings being provided with an outwardly extending neck as shown, for convenience in making suitable connections to the openings 4, 6 and 8; and for a different use for opening 9 as will be described below. Opening 9 has a rubber cork 11 inserted therein, as shown.

Connected to opening 4 is a manometer 10 which may be either conventional in nature, or preferably one such as is shown in the copending United States patent application Serial No. 557,202, in the name of Clarence Lloyd Claff. The manometer used must be one having the requisite accuracy of measurement. Connection is made from one leg 12 of the manometer by means of rubber tubing 14 to the conventional cork-and-tube assembly 16 fitting into neck 4. At the other end of the tube of assembly 16 there are wrapped some layers of blotting paper 18 which may have a few drops of KOH thereon to absorb carbon monoxide in the gas space 24 above the level of the fluid in the tank. The other (outlet) leg 19 of the manometer is connected via tubing 20 to an ambient compensating pressure tank 22. The volume of tank 22 is to be the same as the volume of gas or air 24 lying above the surface of the fluid 26. Preferably the manometer is one having the cross-connecting valve 23, as shown in said United States patent application.

In view of the fact that the volume of enclosures 22 and 24 are approximately the same, then any change in the pressure of the volume 24 due to ambient temperature change will be opposed by a like change in pressure in the compensating tank 22, with the result that the reading of pressure given by manometer 10 will be compensated against such temperature changes. It is to be noted that for greatest accuracy the volumes of the connecting tubes 14 and 20 should be kept small compared to the volumes of space 24 and tank 22.

Attached to the neck of opening 6, for example by screw threads, is a cap 28 mounting on its inside face an oxygen electrode 30 such as a Clark cell. The opening 6 is so positioned on the end wall of tank 2 that when the fluid 26 is at its proper level in the tank, the fluid will cover approximately ½ of the active electrode membrane of the cell 30.

An opening is provided in the cap 28 to which an outlet tubing 32 is connected and by means of which fluid may be drawn from the bath 26.

Mounted in the neck of opening 8 is an injector 34, the injector being a tubing of small diameter (such as a pipette or hypodermic needle) which is bent at such an angle that any fluid emerging from the injector will be directed against the exposed portion of the membrane of the cell 30. It will be noted that the end of the injector 34 lies above the level of the fluid 26. The injector 34 can conveniently be held by a rubber vaccine plug in neck 8 in conventional manner, as shown.

A tube connection 36 connects the outlet 32 to the inlet branch 42 of a typical two-way check-valve indicated generally by numeral 38, the latter comprising the three legs or branches 40, 42 and 44. As will be explained below, in a further description of the valve, a one-way check-valve is incorporated in the branch 42 so that fluid may flow from the tank 2 and into branch 44, but not vice versa. A tubing 46 connects the injector 34 with the branch 40, and as will also be explained below, a one-way check-valve structure within branch 40 enables fluid to pass from the pump 72 via tubing 46 into the injector 34. Branch 44 of the valve 38 connects with one side of a diaphragm pump 72 which will now be described.

Referring now to FIG. 2, the interior construction of the valve 38 and the pump are shown. (As will be explained below, it is not necessary to use a single valve body combining the functions of the two check valves as shown, but instead, as is illustrated in FIG. 3, two separate valves may be used.) The valve 38 is small in size, and a valve seat 48 is provided in branch 40 for which a valve member 50 is provided. Valve 50 is made of, for example, neoprene or rubber and has a cone or spherical shape which will seat on the valve seat 48. A stem 52 forms an integral part of valve 50 and fits loosely in the bore of the valve in order to guide the valve member. A light spring 54 is used to bias the valve member 50 against seat 48. The upper end of the bore of the valve is fitted with a screw connection 56 as shown, the inner end of the latter serving as the upper seat for the spring 54. An O-ring 58 serves to make a fluid-tight seal between the member 56 and the valve body 38.

In somewhat similar fashion, the branch 42 extends laterally from the valve body 38, and has threaded on its end the member 58. The interior of member 58 is provided with the valve seat 60, and a neoprene or rubber valve member 62 is provided similar to the valve member 50, for seating on valve seat 60. A light spring 64 serves to bias the valve member 62 against the seat 60. An O-ring 66 serves to make a water-tight or fluid-tight seal as shown, between the respective parts.

Thus it will be seen that fluid may move upwardly from the branch 44 past the valve member 50 (all as viewed in FIG. 2) and out the member 56, but not in a reverse direction. In similar manner, fluid may pass into the valve branch 44 through the member 58 past the valve member 62, but not in reverse direction.

The valve 38 is fastened by conventional means to the upper shell 70 of a diaphragm pump indicated generally by numeral 72. As so fastened, the branch 44 communicates with the interior of the pump 72, as by an extension 75 which is fastened in a suitable hole in the shell. Pump 72 comprises the two shells 70 and 74 which are circular in shape, and cup-shaped. The shells are mounted with their rims 76 and 78 in face-to-face relationship, as shown. The shells 70 and 74 may be made of a transparent plastic such as Lucite, or may be made of a metal such as stainless steel.

Between the opposing rims there is held tightly by its periphery a flexible diaphragm 80 which is preferably made of thin neoprene or rubber. Whatever the material of the diaphragm 80, it must be inert to the fluid 26 that is used in the biological studies to which the apparatus is adapted.

Thus, the diaphragm 80 divides the total enclosure of the pump 72 into two chambers 82 and 84. Branch 44 communicates with the interior of chamber 82.

The other chamber 84 has two outlets therefrom, one of which is provided with an externally projecting tubular fitting 86 which, like the branch 44, may be fastened by conventional means to the casing in order to communicate with chamer 84. The other outlet similarly is provided with an externally projecting tubular fitting 88.

Fitting 88 is connected by means of tubing 90 to a pump which in this instance is illustrated in exemplary manner as a hand operated rubber bulb 92, the bulb being provided with a one-way check valve 94. The effect of check valve 94 is that when the bulb 92 is compressed, air will be forced along the tube 90 and into chamber 84 but the check valve prevents the return of the air to the bulb 92. Fitting 88 communicates with an adjustable needle or bleed valve 96 which is conventional in nature. The function of the needle or bleed valve 96 is to bleed air from the chamber 84 at a predetermined rate, the rate being determined by the adjustable needle valve member 98.

The two shells 70 and 74 may be fastened together in conventional manner, not shown herein, but for example by means of peripherally-spaced bolts or an external clamping ring, in order to compress the diaphragm 80 between the opposing edges 76 and 78, thus making an air and water-tight seal for each of the compression chambers 82 and 84.

Referring now to FIG. 3, there is shown a slightly different embodiment in which, instead of a single valve 38 being used, a pair of valves 100 and 102 are used. Each of the valves 100 and 102 is a one-way check valve of conventional nature and similar in construction to the check valve members and seats found in valve 38. It will be observed (since the construction of the valves is clear from the drawings, both FIG. 2 and FIG. 3) that fluid can move out of the chamber 82 through the valve 100 and into the tubing 46, but cannot move in a reverse direction because of the valve member 104; whereas fluid may move through tubing 36 into chamber 82 via the valve 102 but cannot move in a reverse direction because of the valve member 106. The volume of the fluid is kept constant since what is withdrawn from the respiration chamber is forced back against the $O_2$ electrode.

The operation of the apparatus is as follows:

The tank 2 is filled to a proper level with the fluid 26, and the fish 110 to be studied is placed in the fluid. The pumping system (comprising the elements: injector 34, outlet 32, tubing 36, valve 38, chamber 82, and tubing branch 46) is then primed with the fluid 26.

With the several parts connected as shown and primed, if the bulb 92 is now squeezed, it will force air via tubing 90 and fitting 86 into chamber 84. This will deflect the diaphragm 80 in an upward direction, thus decreasing the volume of chamber 82. The decrease in volume will cause fluid to rise in the tubing 46 and be ejected from the nozzle 34 which, as indicated above, has been so oriented that the ejected fluid will strike the membrane at the end of the electrode 30 of the Clark cell 28. By adjusting bleed valve 96, the length of time during which fluid is ejected from the nozzle 34 against the cell can be varied because if the bleed valve is fully open, the air in chamber 84 will be exhausted rapidly via the fitting 88 and valve 96, thus rapidly relieving air pressure in chamber 84 and thus permitting diaphragm 80 to relax. On the other hand, if the bleed valve 96 is partly restricted, then the ejection of bath fluid 26 from the nozzle 34 will be longer, because of the longer time it takes the air to bleed from the chamber 84.

When it is desired to measure the oxygen tension of the fluid 26, the bulb 92 is periodically squeezed, thus pulsing the fluid 26 against the Clark cell for a high accuracy in the measurement of the oxygen tension.

As indicated above, the function of the manometer 10 is to measure the pressure of the gas or air in the space 24 above the level of fluid 26 in tank 2. Thus, as metabolism of the fish 110 progresses, there will be a change in the balance between the gas quantity in the space 24 and the gas tension in fluid 26, thus changing the gas pressure in the space 24. This change of pressure will be indicated by the manometer 10.

It will thus be observed that the system is a constant volume one, and one in which the volume of liquid withdrawn in a portion of a pump cycle is promptly returned during the remainder of the cycle. The volume in the whole system (gas and liquid) remains constant. The equilibration of gasses ($O_2$ and $CO_2$) is prompt, since the $CO_2$ given off by the fish is quickly equilibrated between water phase and gas phase, and the KOH filter or blotting paper 18 can pick up the $CO_2$ rapidly from the gas phase.

If one wishes to add a drug to the bath during an experiment, it can be done, not by "dumping" as in the case of prior art devices, but by inserting a carefully calibrated hypodermic syringe needle through the rubber cork in the neck of opening 9, and delivering the drug into the liquid phase. Then if one withdraws, via the same needle inserted further, the same amount of air or gas in space 24, the manometer will return to its original setting, since the total volume of the system has not changed.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense.

Having described the invention, what is claimed is:

1. Apparatus for the study of marine life comprising in combination a closed tank containing a fluid in which the marine life may be immersed, said fluid only partially filling the tank so as to leave a volume of gas in the tank above the surface of the fluid; first, second, and third openings in the tank; an oxygen-cell mounted at the first opening and having its electrode exposed to the interior of the tank and the fluid therein; an injector mounted in the second opening and positioned to direct fluid issuing therefrom against said electrode; a manometer, one end of which is connected to said third opening thereby to measure the pressure of said volume of gas; a compensating chamber, separate from said tank and equal in volume to the volume of gas existing in the tank above said fluid, said chamber being connected to the other end of the manometer thereby to compensate the manometer against changes in ambient temperature of said volume of gas; and a fluid pump having a first inlet and a first outlet, the first outlet being connected to said injector and the first inlet being connected to said first opening, whereby said pump is adapted, when operated, to force said fluid through said injector against said electrode and is adapted to be replenished with said fluid from said first opening.

2. The apparatus of claim 1 in which the level of said fluid in the tank is such as to cover only partially the electrode of said cell, the fluid emerging from said nozzle being adapted to strike and flow over the uncovered portion of said electrode.

3. The apparatus of claim 1 in which said pump comprises an enclosure separated into first and second pump chambers by a flexible diaphragm and including an externally positioned valve body having first, second and third branches, the first branch communicating with said first pump chamber, the second branch comprising said first outlet, and the third branch comprising said first inlet; a valve member in said body permitting flow of fluid into said first pump chamber through said third branch but not in reverse; and a valve member in said body permitting flow of said fluid from said first pump chamber through said second branch but not in reverse; said diaphragm being adapted to be moved in pulsatile manner by increasing and decreasing the pressure of air in said second chamber, whereby said fluid is forced through said injector and against said electrode in pulsed manner.

4. The apparatus of claim 3 including a pulsable source of air connected to said second chamber, and an adjustable bleed valve connected to the second chamber, whereby for a given rate of air pressure increase being applied by said pulsable source to the second chamber, the rate of increase and decrease of the air pressure in the second chamber may be varied.

5. The apparatus of claim 1 in which said pump comprises an enclosure separated into first and second pump chambers by a flexible diaphragm; said first inlet and first outlet each separately communicating with said first chamber and each including a one-way check valve whereby said fluid can flow from the first opening into the first pump chamber via said first inlet but not the reverse, and said fluid can flow from the first pump chamber to said injector via said first outlet but not the reverse; and a second outlet and a second outlet communicating with said second chamber, the second inlet being adapted to be connected to a pulsable source of air and the second outlet being connected to an adjustable bleed valve, whereby for a given rate of air pressure increase being applied by said pulsable source to the second chamber, the rate of increase and decrease of the air pressure in the second chamber may be varied.

6. The apparatus of claim 3 in which said enclosure is in the form of a cylindrical hollow whose diameter is at least ten times its height, and the heights of each of said first and second chambers are approximately equal.

References Cited

UNITED STATES PATENTS

| | | | |
|---|---|---|---|
| 3,083,705 | 4/1963 | Johnson | 103—44 |
| 3,116,712 | 1/1964 | Ogden et al. | 119—3 |
| 3,198,171 | 8/1965 | Westphal | 119—1 |
| 3,303,819 | 2/1967 | Wade | 119—5 |
| 3,320,928 | 5/1967 | Smith | 119—3 |

ALDRICH F. MEDBERY, *Primary Examiner.*

U.S. Cl. X.R.

119—3, 5